(12) United States Patent
Hosmani et al.

(10) Patent No.: US 11,135,957 B2
(45) Date of Patent: Oct. 5, 2021

(54) CONTINUOUSLY ADJUSTING HEADREST DEVICE

(71) Applicant: AMI INDUSTRIES, INC, Colorado Springs, CO (US)

(72) Inventors: Mahesh Virupaxi Hosmani, Karnataka (IN); Jeevanandham Masilamani, Karnataka (IN); Akhil Rajagopal Kozhipuram, Karnataka (IN)

(73) Assignee: AMI INDUSTRIES, INC., Colorado Springs, CO (US)

( * ) Notice: Subject to any disclaimer, the term of this patent is extended or adjusted under 35 U.S.C. 154(b) by 0 days.

(21) Appl. No.: 16/418,881

(22) Filed: May 21, 2019

(65) Prior Publication Data
US 2020/0298739 A1    Sep. 24, 2020

(51) Int. Cl.
*B60N 2/824* (2018.01)
*B64D 11/06* (2006.01)
*B60N 2/826* (2018.01)
*A47C 7/38* (2006.01)

(52) U.S. Cl.
CPC ............. *B60N 2/824* (2018.02); *A47C 7/38* (2013.01); *B60N 2/826* (2018.02); *B64D 11/0642* (2014.12)

(58) Field of Classification Search
CPC ........ B60N 2/812; B60N 2/824; B60N 2/826; B64D 11/0642; A47C 7/38
See application file for complete search history.

(56) References Cited

U.S. PATENT DOCUMENTS

| | | | | | |
|---|---|---|---|---|---|
| 4,411,470 | A | * | 10/1983 | Nishimura | B60N 2/815 297/410 |
| 4,657,425 | A | * | 4/1987 | Takahashi | F16B 7/1481 403/104 |
| 7,044,556 | B1 | * | 5/2006 | Yetukuri | B60N 2/815 297/410 |
| 8,899,685 | B2 | * | 12/2014 | Haeske | B60N 2/809 297/410 |
| 8,967,721 | B2 | * | 3/2015 | Muto | B60N 2/824 297/410 |
| 9,446,692 | B2 | * | 9/2016 | Hagan | B60N 2/897 |
| 9,994,133 | B2 | * | 6/2018 | Boesl | B60N 2/806 |
| 10,507,751 | B2 | * | 12/2019 | James | B60N 2/897 |
| 2012/0086255 | A1 | * | 4/2012 | Ishimoto | B60N 2/809 297/406 |
| 2013/0069412 | A1 | * | 3/2013 | Tscherbner | A47C 7/38 297/391 |

* cited by examiner

*Primary Examiner* — Philip F Gabler
(74) *Attorney, Agent, or Firm* — Cantor Colburn LLP

(57) ABSTRACT

A headrest adjustment mechanism is provided and includes a housing receptive of a rod and gripping jaws disposable in the housing to grip the rod such that the rod is securable and primarily adjustable in a height-wise dimension defined along a longitudinal axis of the rod and such that the rod is movable and pivotable in lateral dimensions defined transversely relative to the longitudinal axis of the rod.

20 Claims, 2 Drawing Sheets

CONTINUOUSLY ADJUSTING HEADREST DEVICE

CROSS REFERENCE TO RELATED APPLICATION

This application claims the benefit of Indian Patent Application No. 2019110010888, filed Mar. 20, 2019, which is incorporated herein by reference in its entirety.

BACKGROUND

The following description relates to headrests and, more particularly, to a continuously adjusting headrest device.

Currently, certain types of seats, such as automobile seats, office furniture and executive seats on regional jets, have a backrest and a headrest attached to an upper portion of the backrest but lack a capability to provide for continuous adjustment of the headrest relative to the backrest. These seats also tend to lack a capability to have the headrest become locked at any position which is not predefined as a lockable position. Even where the headrests have lockable positions, locking the headrests into those lockable positions often requires several actions to be done by the user.

BRIEF DESCRIPTION

According to an aspect of the disclosure, a headrest adjustment mechanism is provided and includes a housing receptive of a rod and gripping jaws disposable in the housing to grip the rod such that the rod is securable and primarily adjustable in a height-wise dimension defined along a longitudinal axis of the rod and such that the rod is movable and pivotable in lateral dimensions defined transversely relative to the longitudinal axis of the rod.

In accordance with additional or alternative embodiments, the housing is substantially cylindrical and includes an upper plate, a lower plate and a cylindrical member between the upper and lower plates and at least the upper plate defines a through-hole into which the rod is insertible.

In accordance with additional or alternative embodiments, the gripping jaws are arranged uniformly about a central axis of the housing.

In accordance with additional or alternative embodiments, two pairs of the gripping jaws are arranged uniformly about a central axis of the housing.

In accordance with additional or alternative embodiments, the gripping jaws are spring-loaded.

In accordance with additional or alternative embodiments, each gripping jaw includes a pad including an interior surface configured to grip a corresponding surface of the rod and an exterior surface and elastic elements respectively interposable between an interior surface of the housing and the exterior surface of the pad.

In accordance with additional or alternative embodiments, the interior surface of the pad includes a high-friction material.

In accordance with additional or alternative embodiments, the interior surface of the pad has a similar curvature as the corresponding surface of the rod.

In accordance with additional or alternative embodiments, each of the elastic elements includes one of a compression spring or a tension spring and a pre-load adjustment element configured to pre-load the one of the compression spring or the tension spring.

According to an aspect of the disclosure, a seat is provided and includes a backrest including an upper section, a headrest including a rod and a headrest adjustment mechanism. The headrest adjustment mechanism incudes a housing disposable on the upper section and receptive of the rod and gripping jaws disposable in the housing to grip the rod such that the rod is securable and primarily adjustable in a height-wise dimension defined along a longitudinal axis of the rod and such that the rod is movable and pivotable in lateral dimensions defined transversely relative to the longitudinal axis of the rod.

In accordance with additional or alternative embodiments, the headrest includes first and second rods, the headrest adjustment mechanism is provided as first and second headrest adjustment mechanisms, the housing of the first headrest adjustment mechanism is disposable on a first side of the upper section and is receptive of the first rod and the housing of the second headrest adjustment mechanism is disposable on a second side of the upper section and is receptive of the second rod.

In accordance with additional or alternative embodiments, the housing is substantially cylindrical and comprises an upper plate, a lower plate and a cylindrical member between the upper and lower plates and at least the upper plate defines a through-hole into which the rod is insertible.

In accordance with additional or alternative embodiments, the gripping jaws are arranged uniformly about a central axis of the housing.

In accordance with additional or alternative embodiments, two pairs of the gripping jaws are arranged uniformly about a central axis of the housing.

In accordance with additional or alternative embodiments, the gripping jaws are spring-loaded.

In accordance with additional or alternative embodiments, each gripping jaw includes a pad including an interior surface configured to grip a corresponding surface of the rod and an exterior surface and elastic elements respectively interposable between an interior surface of the housing and the exterior surface of the pad.

In accordance with additional or alternative embodiments, the interior surface of the pad includes a high-friction material.

In accordance with additional or alternative embodiments, the interior surface of the pad has a similar curvature as the corresponding surface of the rod.

In accordance with additional or alternative embodiments, each of the elastic elements includes one of a compression spring or a tension spring and a pre-load adjustment element configured to pre-load the one of the compression spring or the tension spring.

According to another aspect of the disclosure, a passenger seat is provided and includes a backrest, a headrest and first and second headrest adjustment mechanisms. The backrest includes an upper section and the headrest includes first and second rods. The first and second headrest adjustment mechanisms each include a housing disposable on first and second sides of the upper section, respectively, and receptive of the first and second rods, respectively, and gripping jaws disposable in the housing to grip the first and second rods, respectively, such that the first and second rods are each securable and primarily adjustable in a height-wise dimension defined along respective longitudinal axes of the first and second rods and such that the first and second rods are each movable and pivotable in lateral dimensions defined transversely relative to the longitudinal axes of the first and second rods.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, a continuously adjustable headrest is provided and includes a housing, spring-loaded gripping jaws and a cover plate. The spring-loaded gripping jaws are housed inside the housing and move transversely or perpendicularly relative to an axis of the housing. Each spring-loaded gripping jaw has two spring elements which are mounted in between the spring-loaded gripping jaw and the housing. The spring-loaded gripping jaws can be bonded with anti-slip rubber pads to increase their respective coefficients of friction. During operation of the continuously adjustable headrest, as a rod of the headrest enters and moves within the housing, the spring-loaded gripping jaws move apart and compress. This generates resistance and enables the spring-loaded gripping jaws to continuously grip the headrest rod.

The continuously adjustable headrest is thus primarily adjustable along an axis the rod(s) of the headrest and secondarily adjustable in lateral directions.

Figure 1:
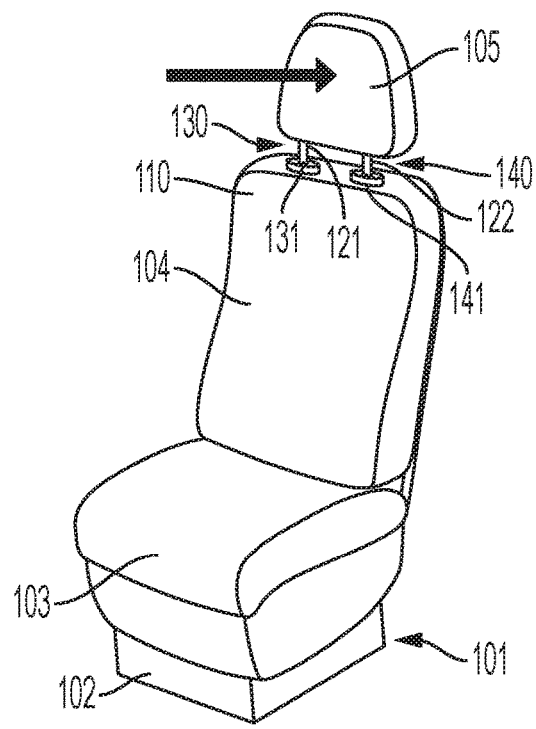
FIG. 1 is a perspective view of a seat in accordance with embodiments of the invention.

With reference to FIG. 1, a passenger seat 101 is provided and includes a base 102 on which a seat 103 is disposed, a backrest 104 which is adjacent to the seat 103 and which may be pivotable relative to the seat 103, a headrest 105, a first headrest adjustment mechanism 130 and a second headrest adjustment mechanism 140. The passenger seat 101 may be configured, for example, as an executive passenger seat of an aircraft or jet but it is to be understood that the passenger seat can be configured for use in automobiles or other vehicles as well as office or residential furniture (the following description will relate to the exemplary case of the passenger seat 101 being an executive passenger seat of an aircraft or a jet). In use, a passenger can sit in the passenger seat 101 with his backside supported on the seat 103, his back supported by the backrest 104 and his head supported by the headrest 105.

Figure 2:
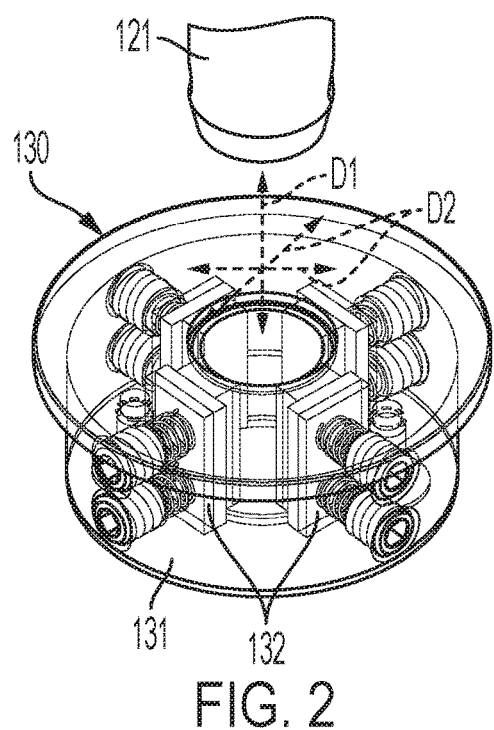
FIG. 2 is a perspective view of a continuously adjustable headrest mechanism of the seat of FIG. 1 in an unlocked condition in accordance with embodiments.
Figure 3:
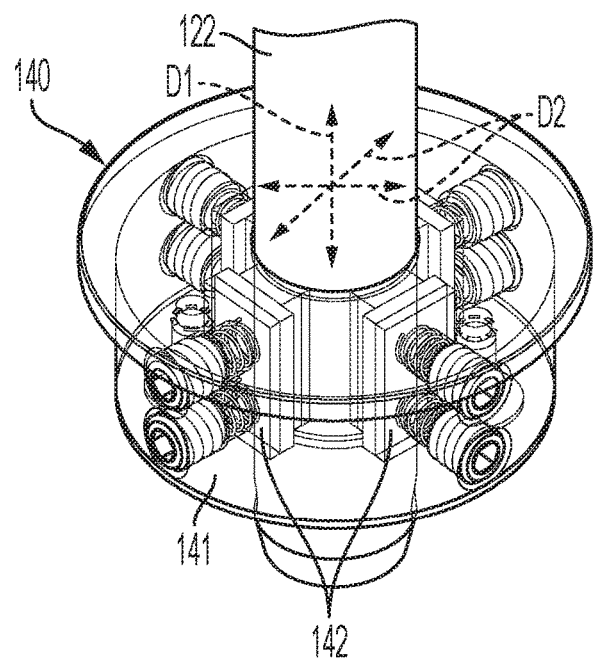
FIG. 3 is a perspective view of a continuously adjustable headrest mechanism of the seat of FIG. 1 in a locked condition in accordance with embodiments.
Figure 4:
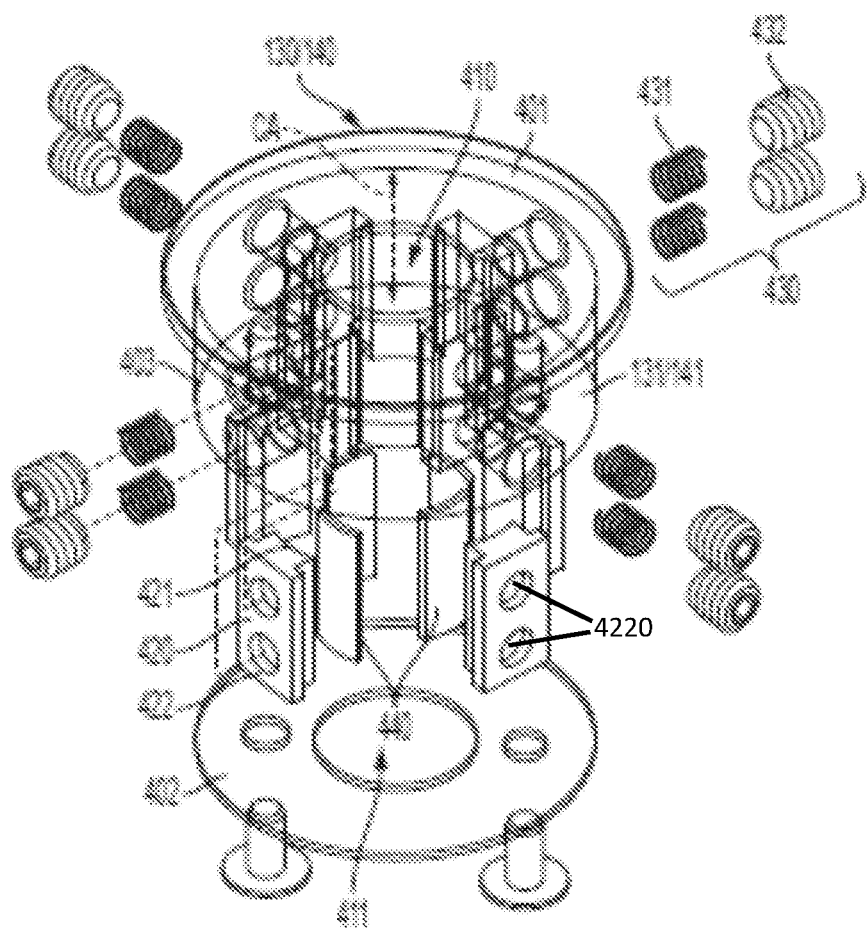
FIG. 4 is an exploded perspective view of the continuously adjustable headrest of FIGS. 2 and 3.

With continued reference to FIG. 1 and with additional reference to FIGS. 2-4, the backrest 104 includes an upper section 110, the headrest 105 includes a first rod 121 and a second rod 122, the first headrest adjustment mechanism 130 includes a first housing 131 and first gripping jaws 132 and the second headrest adjustment mechanism 140 includes a second housing 141 and second gripping jaws 142.

For the first headrest adjustment mechanism 130, which is shown in FIG. 2 in an unlocked condition, the first housing 131 is disposable on a first side of the upper section 110 and is receptive of the first rod 121. The first gripping jaws 132 are disposable in the first housing 131 to grip the first rod 121 such that the first rod 121 is securable and primarily adjustable in a height-wise dimension D1 and such that the first rod 121 is movable and pivotable in lateral dimensions D2. The height-wise dimension D1 is defined along or in parallel with respective longitudinal axes of the first rod 121 and the second rod 122. The lateral dimensions D2 are defined transversely relative to the height-wise dimension D1.

For the second headrest adjustment mechanism 140, which is shown in FIG. 3 in a locked condition, the second housing 141 is disposable on a second side of the upper section 110, which is opposite the first side of the upper section 110, and is receptive of the second rod 122. The second gripping jaws 142 are disposable in the second housing 141 to grip the second rod 122 such that the second rod 122 is securable and primarily adjustable in the height-wise dimension D1 and such that the second rod 122 is movable and pivotable in the lateral dimensions D2.

It is to be understood that, while the first headrest adjustment mechanism 130 is shown in FIG. 2 in the unlocked condition, in which the first rod 121 is not yet received in the first housing 131, and that the second headrest adjustment mechanism 140 is shown in FIG. 3 in the locked condition, in which the second rod 122 is received in the second housing 141, the figures are reversible and interchangeable. That is, a figure showing the first headrest adjustment mechanism 130 in the locked condition would appear similar to FIG. 3 and a figure showing the second headrest adjustment mechanism 140 in the unlocked condition would appear similar to FIG. 2.

In accordance with embodiments, the passenger seat 101 can be configured such that the headrest 105 has only a single rod that is received in a single headrest adjustment mechanism. In such embodiments, the single headrest adjustment mechanism operates similarly as the first and second headrest adjustment mechanisms 130 and 140.

As shown in greater detail in FIG. 4, the first housing 131 and the second housing 141 are each substantially cylindrical and each includes an upper plate 401, a lower plate 402 and a cylindrical member 403 between the upper plate 401 and the lower plate 402. At least the upper plate 401 defines a through-hole 410 into which the first rod 121 or the second rod 122 is insertible. In accordance with some further embodiments, the lower plate 402 and the corresponding part of the upper section 110 can also be formed to define additional through-holes 411 into which the first rod 121 or the second rod 122 is insertible. Each of the first gripping jaws 132 and the second gripping jaws 142 (see FIGS. 2 and 3) is each arranged substantially uniformly about respective central axes CA of the first housing 131 or the second housing 132 (see FIGS. 2 and 3), respectively, where the respective central axes CA are substantially coaxial with the longitudinal axes of the first rod 121 and the second rod 122 (see FIGS. 2 and 3).

In accordance with embodiments and as shown in FIGS. 2 and 3, two pairs of the first gripping jaws 132 may be arranged uniformly about the central axis CA of the first housing 131 and two pairs of the second gripping jaws 142 may be arranged uniformly about the central axis CA of the second housing 142.

For each arrangement of the first gripping jaws 132 and the second gripping jaws 142, the first gripping jaws 132 and the second gripping jaws 142 are spring-loaded and include a pad 420 and elastic elements 430. The pad 420 includes an interior surface 421 that is configured to grip a corresponding surface of the first rod 121 or the second rod 122 and an exterior surface 422. The elastic elements 430 can be provided in a linear formation arranged along the height-wise dimension D1 (see FIGS. 2 and 3) and are respectively interposable between an interior surface of the first housing 131 or the second housing 141 and recesses 4220 defined in the exterior surface 422 of the pad 420. Each of the elastic elements 430 can include one of a spring 431 (e.g., a helical compression spring or a tension spring) and a pre-load adjustment element 432. The pre-load adjustment element 432 can be provided as a screw element that is configured to pre-load the spring 431.

In accordance with further embodiments, the interior surface 421 of the pad 420 can include a high-friction material 440 that is adhesively bonded to the pad 420 and generates high-friction contact between the pad 420 and the first rod 121 or the second rod 122. Whether the pad 420 includes the high-friction material 440 or not, the interior surface of the pad 420 (and the high-friction material 440) can have a similar curvature as the corresponding surface of the first rod 121 or the second rod 122.

In an operation of the passenger seat 101 of FIG. 1, the first gripping jaws 132 and the second gripping jaws 142 maintain the headrest 105 in a vertical position above the upper section 110 at which a passenger's head would be expected to be positioned and each pre-load adjustment element 432 set the first gripping jaws 132 and the second gripping jaws 142 in neutral conditions at which the first rod 121 and the second rod 122 provide the headrest 105 with a similar orientation as the backrest 104. In an event this passenger rests his head on the headrest 105 and pushes backward as demonstrated by the arrow of FIG. 1, the rearward ones of the first gripping jaws 132 and the second gripping jaws 142 would be compressed and the forward ones of the first gripping jaws 132 and the second gripping jaws 142 would be extended. Such compression and extension would tend to resist the pressure applied by the passenger to impede excessive backward leaning of the headrest 105.

In another operation of the passenger seat 101 of FIG. 1, the first gripping jaws 132 and the second gripping jaws 142 maintain the headrest 105 in a vertical position above the upper section 110 at which a passenger's head would be expected to be positioned and each pre-load adjustment element 432 set the first gripping jaws 132 and the second gripping jaws 142 in positive conditions at which the first rod 121 and the second rod 122 provide the headrest 105 with a forward lean relative to the backrest 104. In an event this passenger rests his head on the headrest 105 and pushes backward, the compression and extension of the first gripping jaws 132 and the second gripping jaws 142 would tend to resist the pressure applied by the passenger to impede any backward tilting of the headrest 105.

Technical effects and benefits of the features described herein are the provision of continuous headrest adjustment, an ability of the headrest to the locked at any given position and improved operating ergonomics with no additional locking actions being required other than a single quick and easy action for adjusting and locking.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A headrest adjustment mechanism, comprising:
a housing receptive of a rod; and
gripping jaws disposable in the housing to grip the rod such that the rod is securable and adjustable in a height-wise dimension defined along a longitudinal axis of the rod and such that the rod is movable and pivotable,
wherein each gripping jaw comprises a pad, which is elongate in a height dimension of the rod, to grip a corresponding surface of the rod and an elastic element interposed between an interior surface of the housing and the pad, the pad itself being unconnected directly to the interior surface of the housing but for the elastic element.

2. The headrest adjustment mechanism according to claim 1, wherein the housing is substantially cylindrical and comprises an upper plate, a lower plate and a cylindrical member between the upper and lower plates and at least the upper plate defines a through-hole into which the rod is insertible.

3. The headrest adjustment mechanism according to claim 1, wherein the gripping jaws are arranged uniformly about a central axis of the housing.

4. The headrest adjustment mechanism according to claim 1, wherein two pairs of the gripping jaws are arranged uniformly about a central axis of the housing.

5. The headrest adjustment mechanism according to claim 1, wherein the gripping jaws are spring-loaded.

6. The headrest adjustment mechanism according to claim 1, wherein:
the pad comprises an interior surface configured to grip the corresponding surface of the rod and an exterior surface;
the elastic element is provided as multiple elastic elements respectively interposable between the interior surface of the housing and recesses defined in the exterior surface of the pad in a linear arrangement defined along the height dimension of the rod, and
each elastic element extends between longitudinal ends at the exterior surface of the pad and the interior surface of the housing, respectively, along a longitudinal axis arranged in parallel with a radial dimension of the rod.

7. The headrest adjustment mechanism according to claim 6, wherein the interior surface of the pad comprises a frictional material.

8. The headrest adjustment mechanism according to claim 7, wherein:
the interior surface of the pad has a similar curvature as the corresponding surface of the rod, and
the frictional material is applied to the interior surface and has a same curvature as the interior surface.

9. The headrest adjustment mechanism according to claim 6, wherein each of the elastic elements comprises:
a helical compression spring; and
a pre-load adjustment element configured to pre-load the helical compression spring.

10. A seat, comprising:
a backrest comprising an upper section;
a headrest comprising a rod; and a headrest adjustment mechanism, comprising:
  a housing disposable on the upper section and receptive of the rod; and
  gripping jaws disposable in the housing to grip the rod such that the rod is securable and adjustable in a height-wise dimension defined along a longitudinal axis of the rod and such that the rod is movable and pivotable,
  wherein each gripping jaw comprises a pad, which is elongate in a height dimension of the rod, to grip a corresponding surface of the rod and an elastic element interposed between an interior surface of the housing and the pad, the pad itself being unconnected directly to the interior surface of the housing but for the elastic element.

11. The seat according to claim 10, wherein:
the headrest comprises first and second rods,
the headrest adjustment mechanism is provided as first and second headrest adjustment mechanisms,
the housing of the first headrest adjustment mechanism being disposable on a first side of the upper section and being receptive of the first rod, and
the housing of the second headrest adjustment mechanism being disposable on a second side of the upper section and being receptive of the second rod.

12. The seat according to claim 10, wherein the housing is substantially cylindrical and comprises an upper plate, a lower plate and a cylindrical member between the upper and lower plates and at least the upper plate defines a through-hole into which the rod is insertible.

13. The seat according to claim 10, wherein the gripping jaws are arranged uniformly about a central axis of the housing.

14. The seat according to claim 10, wherein two pairs of the gripping jaws are arranged uniformly about a central axis of the housing.

15. The seat according to claim 10, wherein the gripping jaws are spring-loaded.

16. The seat according to claim 10, wherein:
the pad comprises an interior surface configured to grip the corresponding surface of the rod and an exterior surface;
the elastic element is provided as multiple elastic elements respectively interposable between the interior surface of the housing and recesses defined in the exterior surface of the pad in a linear arrangement defined along the height dimension of the rod, and
each elastic element extends between longitudinal ends at the exterior surface of the pad and the interior surface of the housing, respectively, along a longitudinal axis arranged in parallel with a radial dimension of the rod.

17. The seat according to claim 16, wherein the interior surface of the pad comprises a frictional material.

18. The seat according to claim 17, wherein:
the interior surface of the pad has a similar curvature as the corresponding surface of the rod, and
the frictional material is applied to the interior surface and has a same curvature as the interior surface.

19. The seat according to claim 16, wherein each of the elastic elements comprises:
a helical compression spring; and
a pre-load adjustment element configured to pre-load the helical compression spring.

20. A passenger seat, comprising:
a backrest comprising an upper section;
a headrest comprising first and second rods; and
first and second headrest adjustment mechanisms each of which comprises:
  a housing disposable on first and second sides of the upper section, respectively, and receptive of the first and second rods, respectively; and
  first and second sets of gripping jaws disposable in the housing to grip the first and second rods, respectively, such that the first and second rods are each securable and adjustable in a height-wise dimension defined along respective longitudinal axes of the first and second rods and such that the first and second rods are each movable and pivotable,
wherein:
each of the first and second sets of griping jaws comprises multiple gripping jaws arranged about a corresponding one of the first and second rods, and each gripping jaw of each of the first and second sets of gripping jaws comprises:
a pad, which is elongate in a height dimension of the corresponding one of the first and second rods, to grip a corresponding surface of the corresponding one of the first and second rods; and
multiple elastic elements interposed between an interior surface of a corresponding one of first and second sides of the housing and the pad in a linear arrangement defined along the height dimension of the corresponding one of the first and second rods,
wherein:
the pad itself is unconnected directly to the interior surface of the corresponding one of the first and second sides of the housing but for the elastic element, and
the interior surface of the pad has a similar curvature as the corresponding surface of the corresponding one of the first and second rods and frictional material is applied to the interior surface and has a same curvature as the interior surface.

* * * * *